(12) United States Patent
Stoppelmann et al.

(10) Patent No.: US 8,865,821 B2
(45) Date of Patent: Oct. 21, 2014

(54) POLYAMIDE MOULDING COMPOSITION AND USE THEREOF

(71) Applicant: EMS-Patent AG, Domat/Ems (CH)

(72) Inventors: Georg Stoppelmann, Bonaduz (CH); Sabine Bertram, Domat/Ems (CH); Mark Pfleghar, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 0 days.

(21) Appl. No.: 13/873,982

(22) Filed: Apr. 30, 2013

(65) Prior Publication Data

US 2014/0066560 A1 Mar. 6, 2014

(30) Foreign Application Priority Data

Aug. 28, 2012 (EP) .................................. 12182021

(51) Int. Cl.
*C08K 3/40* (2006.01)
*C08K 3/22* (2006.01)
*C08K 7/14* (2006.01)

(52) U.S. Cl.
CPC ... *C08K 3/22* (2013.01); *C08K 3/40* (2013.01); *C08K 7/14* (2013.01)
USPC .......................................... 524/494; 524/430

(58) Field of Classification Search
USPC ................................................. 524/430, 494
See application file for complete search history.

(56) References Cited

U.S. PATENT DOCUMENTS

| 2009/0292048 A1* | 11/2009 | Li et al. ........................... 524/115 |
| 2010/0227122 A1 | 9/2010 | Kumazawa et al. |
| 2013/0106659 A1* | 5/2013 | Yung et al. ............. 343/700 MS |
| 2014/0002311 A1* | 1/2014 | Takano et al. .......... 343/700 MS |

FOREIGN PATENT DOCUMENTS

| EP | 1274288 A1 | 1/2003 |
| EP | 1 882 719 A1 | 1/2008 |
| EP | 1882719 A1 | 1/2008 |
| EP | 2 390 282 A1 | 5/2010 |
| EP | 2 335 936 A1 | 6/2011 |
| EP | 2 420 593 A1 | 2/2012 |
| WO | 01/23189 A1 | 4/2001 |
| WO | 2009/141799 A1 | 11/2009 |
| WO | WO 2012/128219 | * 9/2012 |

OTHER PUBLICATIONS

Extended European Search Report dated Jul. 2, 2013, issued in European Application No. EP 12 18 2021.
European Patent Office Search Report for Application No. EP 12 18 2021 dated Feb. 20, 2013.
Search Report issued in corresponding European Patent Application No. 13 19 2261.9 dated Jan. 7, 2014.

* cited by examiner

*Primary Examiner* — Peter Szekely
(74) *Attorney, Agent, or Firm* — Sughrue Mion, PLLC

(57) ABSTRACT

A thermoplastic molding composition, in particular a polyamide molding composition, consisting of, by weight:
(A) 20-88%—thermoplastic material;
(B) 10-60%—fibrous fillers, formed from
  (B1) 10-60%—glass fibers, selected from:
    glass fibers (B1_1) with a non-circular cross section, wherein the axis ratio of the main cross-sectional axis to the secondary cross-sectional axis is at least 2;
    high-strength glass fibers (B1_2) with a glass composition (substantially $SiO_2$, AlO, and MgO; or mixtures thereof;
  (B2) 0-20%—glass fibers, different from glass fibers of component (B1) and have a circular cross section; and
  (B3) 0-20%—further fibrous fillers, different from fibers of (B1) and (B2), not based on glass, and selected from the group: carbon fibers, graphite fibers, aramid fibers, nanotubes;
(C) 2-10%—LDS additive or a mixture of LDS additives;
(D) 0-30%—particulate filler;
(E) 0-2%—further, different additives;
the sum of (A)-(E) is 100% by weight.

32 Claims, No Drawings

POLYAMIDE MOULDING COMPOSITION AND USE THEREOF

TECHNICAL FIELD

The present invention relates to polyamide moulding composition having improved mechanical properties. The moulding composition contain glass fibres and also particulate fillers. Moulded parts produced therefrom can be metallised selectively after partial irradiation. The moulding composition according to the invention are used in particular for the production of moulded interconnected devices.

PRIOR ART

Compared to previous interconnected devices, moulded interconnected devices (MIDs)—thermoplastic interconnected devices produced by means of injection moulding—have the advantage of improved freedom of design, good environmental compatibility and the potential for rationalisation with regard to the production method of the end product. The integration of electrical and mechanical functions in an injection-moulded part can lead to miniaturisation of the assembly. In addition, completely new functions can be provided and practically any shapes can be formed. Two-component injection moulding, hot embossing and laser subtractive structuring are MID manufacturing techniques already used for some years in series production.

The additive laser structuring technique, with which the moulded part produced in the standard injection moulding process is structured by means of a laser, is likewise known from EP-A-1 274 288. By means of this method, the regions that will later carry the conducting tracks are partially nucleated with metal atoms on the plastic surface, on which a metal layer then grows in chemically reductive metallisation baths. The metal nuclei are produced by breaking open metal compounds contained in the carrier material in a dispersed manner. Particularly well-suited metal compounds for laser direct structuring are cupriferous metal oxides with spinel structure. Plastic regions not irradiated remain unchanged in the metallisation bath. In some examples in EP-A-1 274 288, the moulding compound formed from 70% by weight of polybutylene terephthalate, 30% by weight of silicic acid and 5% by weight of a copper/chromium spinel is processed to form a casing for a mobile telephone, which is irradiated by an Nd—YAG laser and is then metallised in the reductive copper-plating bath.

A method for producing interconnected devices made of plastic is described in EP-A-2 420 593, in which metal oxides with an oxygen vacancy are used as LDS (laser direct structuring) additives. A series of a wide range of polymers are specified as a suitable matrix, although no specific polymer or polymer class is preferred. Unreinforced moulding compounds based on polypropylene and polycarbonate are used in the examples.

EP-A-2 335 936 indicates problems with primary, currentless metallisation. For polycarbonate-based moulding compounds, the homogeneity of the conductor tracks deposited currentlessly after laser structuring is considerably improved by use of an acid, such as phosphoric acid, or an acid salt.

A possibility for improving the toughness, in particular the notch toughness, of moulding compounds suitable for LDS is disclosed in EP-A-2 390 282. The toughness of moulding compounds based on aromatic polycarbonates is considerably improved by small amounts of sulphonate salts, such as potassium perfluorobutane sulphonate.

WO-A-2009/141799 describes flame-retardant, laser-structurable moulding compounds based on polycarbonate and polycarbonate/ABS blends. In the examples, unreinforced moulding compounds containing a copper/chromium spinel as LDS additive are used exclusively.

DISCLOSURE OF THE INVENTION

Based on the above, the object of the present invention was to provide thermoplastic composition (compound) suitable for MID technology, in particular polyamide moulding composition, and in particular those that also contain particulate fillers in addition to glass fibres, with which moulded articles having good mechanical properties, in particular having high rigidity, high tear strength and good impact toughness, can be produced and which do not have the disadvantages of the prior art.

The thermal and mechanical properties and also the associated fields of use of these interconnected devices are determined primarily by the underlying thermoplastic moulding composition. Polyamides are nowadays widespread as structural elements for interior areas and exterior areas, which can be attributed substantially to the outstanding mechanical properties.

An improvement of the mechanical properties, such as strength and rigidity, can be achieved in particular by the addition of fibrous reinforcement substances, such as glass fibres or carbon fibres. In many cases, particulate fillers are also used in addition to the glass fibres, whether in order to colour the moulding compositions by means of inorganic pigments or to implement specific property modifications.

The moulding composition that can be structured by means of laser direct structuring may contain what are known as laser additives, which release metals under the action of electromagnetic radiation. Metal oxides, in particular spinels, are often used for this laser-induced nucleation. In order to increase the microroughness and therefore the adhesion of the conductor track applied later, such moulding composition may additionally contain considerable amounts of further fillers, such as talc. Due to the addition of particulate fillers to the glass-fibre-reinforced moulding composition, the mechanical properties are generally considerably worsened however, and in particular the tear strength, the elongation at tear and also the impact toughness is reduced. Consequently, no content or only a small content of particulate fillers can be used in conjunction with standard glass fibres if the rigidity, the tear strength and also the impact toughness are considered as critical parameters for the moulded part.

On the one hand, the addition of the particulate fillers necessary for MID moulding compositions to glass-fibre-reinforced moulding compositions results in increased suitability for laser structuring and conductor track adhesion, but on the other hand leads to a deterioration of the mechanical properties, such as tear strength and toughness. The present invention is based on these conflicting problems.

Specifically, the invention comprises a moulding composition having high rigidity, tear strength and high impact toughness according to Claim 1, in particular consisting of:
(A) 20-88% by weight of a thermoplastic material. Here, this thermoplastic component (A) is preferably formed from polyamide (A1) with the proviso that up to 40%, preferably up to 20%, up to 10%, or up to 5% (based here in each case on the proportion by weight of the overall component (A) in the moulding composition) of the polyamide (A1) can be replaced by a thermoplastic (A2) not based on polyamide;

(B) 10-70% by weight of fibrous fillers (component (B)), formed from
  (B1) 10-70% by weight of glass fibres, selected from the group consisting of: glass fibres with a non-circular cross section (B1_1), wherein the axis ratio of the main cross-sectional axis to the secondary cross-sectional axis is at least 2;
    high-strength glass fibres (B1_2) with a glass composition, which are formed substantially from the components silicon dioxide, aluminium oxide and magnesium oxide, which preferably have a content of magnesium oxide of at least 5% by weight and a content of calcium oxide of at most 10% by weight, particularly preferably of at most 5% by weight; or mixtures of such glass fibres of type B1_1 and B1_2;
  (B2) 0-20% by weight of other glass fibres, which are different from the glass fibres of component (B1) and have a circular cross section;
  (B3) 0-20% by weight of further fibrous fillers, which are different from the fibres of components (B1) and (B2), are not based on glass, and are selected from the group: carbon fibres, graphite fibres, aramid fibres, nanotubes;
(C) 2-10% by weight of LDS additive or a mixture of LDS additives;
(D) 0-30% by weight of particulate filler;
(E) 0-2% by weight of further, different additives;
wherein the sum of (A)-(E) makes up 100% by weight.

The glass fibres of types (B1_1) and (B1_2) may also in each case be mixtures with different fibres, which all have the features according to the claims however, and may equally be a mixture of the fibres (B1_1) and (B1_2).

The fibres of type (B1_2) preferably have a circular cross section.

Here, the component (A) is preferably a thermoplastic selected from the following group: polyamide, polycarbonate, polystyrene, polymethyl methacrylate, acrylonitrile butadiene styrene copolymer, acrylonitrile styrene copolymer, polyolefin, polyoxymethylene, polyester, in particular polyethylene terephthalate, polybutylene terephthalate, polysulfone (in particular of the PSU, PESU, PPSU type), polyphenylene ether, polyphenylene sulphide, polyphenylene oxide, liquid-crystalline polymers, polyether ketone, polyether ether ketone, polyimide, polyamide imide, polyester imide, polyether amide, polyester amide, polyether ester amide, polyurethane (in particular of the TPU, PUR type), polysiloxane, polyacrylate, polymethacrylate and mixtures or copolymers based on such systems. Here, such systems can also preferably be used in combination with the impact toughness modifiers specified below and discussed under (A2).

Here, the component (A) preferably consists completely of polyamide or a mixture of various polyamides.

Here, the proportion of component (A) preferably lies in the range of 25-82% by weight, preferably in the range of 30-77% by weight, wherein the total proportion of (A) preferably also lies in the range of 25-82% by weight, particularly preferably in the range of 30-77% by weight.

The proportion of component (B1) preferably lies in the range of 30-65% by weight, preferably in the range of 35-60% by weight, wherein the proportions of (B2) and/or (B3) furthermore are preferably zero.

As explained, the component (A) consists primarily, that is to say preferably in a proportion of more than 60% based on the plastic matrix, of polyamide. In other words, the ratio of (A1) to (A2) is preferably in any case >1.5, preferably >2, particularly preferably >5.

The other thermoplastic material (component A2), which may likewise be provided in the form of a mixture with the polyamide constituent (A1), is preferably selected from the group consisting of: polycarbonate, polystyrene, polymethyl methacrylate, acrylonitrile butadiene styrene copolymer, acrylonitrile styrene copolymer, polyolefin, polyoxymethylene, polyester, in particular polyethylene terephthalate, polybutylene terephthalate, polysulfone (in particular of the PSU, PESU, PPSU type), polyphenylene ether, polyphenylene sulphide, polyphenylene oxide, liquid-crystalline polymers, polyether ketone, polyether ether ketone, polyimide, polyamide imide, polyester imide, polyether amide, polyester amide, polyether ester amide, polyurethane (in particular of the TPU, PUR type), polysiloxane, polyacrylate, polymethacrylate, and mixtures or copolymers based on such systems.

The proportion of this further matrix component (A2) preferably lies in the range of 0-20% by weight, preferably in the range of 0-10% by weight or in the range of 0-5% by weight. However, there is preferably no further matrix component (A2), that is to say component (A1) is preferably exclusively present in the moulding composition.

In a further embodiment, the moulding composition according to the invention contains up to 40% by weight of one or more impact toughness modifiers (ITMs) as component (A2). An ITM concentration in the range between 5 and 40% by weight, in particular of 7-30% by weight, is preferred. The impact toughness modifier may be a natural rubber, polybutadiene, polyisoprene, polyisobutylene, a mixed polymer of butadiene and/or isoprene with styrene or styrene derivatives and other comonomers, a hydrogenated mixed polymer and/or a mixed polymer that is produced by grafting or copolymerisation with acid anhydrides, (meth)acrylic acid and esters thereof. The impact toughness modifier (A2) may also be a grafted rubber with a cross-linked elastomer core, which consists of butadiene, isoprene or alkyl acrylates and has a graft sleeve formed from polystyrene, a nonpolar or polar olefin homopolymer and copolymer, such as ethylene propylene rubber, ethylene propylene diene rubber and ethylene octene rubber or ethylene vinyl acetate rubber, or a nonpolar or polar olefin homopolymer and copolymer, which is produced by grafting or copolymerisation with acid anhydrides, (meth)acrylic acid and esters thereof. The impact toughness modifier (A2) may also be a carboxylic-acid-functionalised copolymer, such as poly(ethene-co-(meth)acrylic acid) or poly(ethene-co-1-olefin-co-(meth)acrylic acid), wherein the 1-olefin may be an alkene or an unsaturated (meth)acrylic acid ester with more than 4 atoms, including those copolymers in which the acid groups are neutralised in part with metal ions.

Preferred impact toughness modifiers of component (A2) based on styrene monomers (styrene and styrene derivatives) and other vinyl aromatic monomers are block copolymers formed from alkenyl aromatic compounds and a conjugated diene, and hydrogenated block copolymers formed from an alkenyl aromatic compound and conjugated dienes, or combinations of these ITM types. The block copolymer contains at least one block derived from an alkenyl aromatic compound (A) and at least one block derived from a conjugated diene (B). In the hydrogenated block copolymers, the proportion of aliphatically unsaturated carbon-carbon double bonds has been reduced by hydrogenation. Two-block, three-block, four-block and polyblock copolymers with linear structure are suitable as block copolymers. However, branched and star-shaped structures can also be used. Branched block copolymers are obtained in a known manner, for example by grafting reactions of polymer "side branches" onto a polymer main chain. Vinyl aromatic monomers that are substituted at the aromatic ring and/at the C=C double bond with C1-20 hydrocarbon groups or halogen atoms can also be used as alkenyl aromatic monomers, either in addition to or mixed with styrene.

Examples for alkenyl aromatic monomers are styrene, p-methylstyrene, α-methylstyrene, ethylstyrene, tert-butyl-styrene, vinyl toluene, 1,2-diphenylethylene, 1,1-diphenylethylene, vinyl xylenes, vinyl toluenes vinyl naphthalenes, divinyl benzenes, bromostyrenes, chlorostyrenes, and combinations thereof. Styrene, p-methylstyrene, alpha-methylstyrene and vinyl naphthalene are preferred.

Styrene, α-methylstyrene, p-methylstyrene, ethylstyrene, tert-butyl styrene, vinyl toluene, 1,2-diphenylethylene, 1,1-diphenylethylene or mixtures thereof are preferably used. Styrene is particularly preferably used. Alkenyl naphthalenes may also be used however. For example, 1,3-butadiene, 2-methyl-1,3-butadiene, 2,3-dimethyl-1,3-butadiene, 1,3-pentadiene, 1,3-hexadiene, isoprene, chloroprene and piperylene are possible diene monomers. 1,3-butadiene and isoprene are preferred, in particular 1,3-butadiene (referred to hereinafter as butadiene for short).

Styrene is preferably used as an alkenyl aromatic monomer, and butadiene is preferably used as a diene monomer, that is to say the styrene butadiene block copolymer is preferred. The block copolymers are generally produced by anionic polymerisation in a manner known per se.

In addition, further comonomers can also be used additionally with the styrene and diene monomers. The proportion of comonomers is preferably 0 to 50, particularly preferably 0 to 30, and in particular 0 to 15% by weight, based on the total amount of the monomers used. Suitable comonomers include, for example, acrylates, in particular C1-12-alkyl acrylates such as n-butyl acrylate or 2-ethylhexyl acrylate, and the corresponding methacrylates, in particular C1-12-alkyl methacrylates, such as methyl methacrylate (MMA). Further possible comonomers are (meth)acrylonitrile, glycidyl(meth)acrylate, vinyl methyl ether, diallyl ether and divinylether of bifunctional alcohols, divinylbenzene and vinyl acetate.

In addition to the conjugated diene, the hydrogenated block copolymers of component (A2) optionally also contain proportions of low hydrocarbons, such as ethylene, propylene, 1-butene, dicyclopentadiene or unconjugated dienes. The proportion of unreduced aliphatic unsaturated bonds, which result from the block B, in the hydrogenated block copolymers is less than 50%, preferably less than 25%, in particular less than 10%. The aromatic proportions from block A are reduced at most to 25%. The hydrogenated block copolymers styrene-(ethylene-butylene) two-block copolymers and styrene-(ethylene-butylene)-styrene three-block copolymers are obtained by hydrogenation of styrene-butadiene copolymers and styrene-butadiene-styrene copolymers. The block copolymers preferably consist in an amount of 20 to 90% by weight of block A, in particular in an amount of 50 to 85% by weight of block A. The diene can be incorporated into the block B in 1,2 orientation or in 1,4 orientation.

The molar mass of the block copolymers of component (A2) is preferably 5,000 to 500,000 g/mol, preferably 20,000 to 300,000 g/mol, in particular 40,000 to 200,000 g/mol. Suitable hydrogenated block copolymers are the commercially obtainable products, such as KRATON® (Kraton Polymers) G1650, G1651, and G1652 and also TUFTEC® (Asahi Chemical) H1041, H1043, H1052, H1062, H1141 and H1272.

Examples of non-hydrogenated block copolymers are polystyrene-polybutadiene, polystyrene-poly(ethylene-propylene), polystyrene-polyisoprene, poly(α-methyl-styrene)-polybutadiene, polystyrene-polybutadiene-polystyrene (SBS), polystyrene-poly(ethylene-propylene)-polystyrene, polystyrene-polyisoprene-polystyrene and poly(α-methyl-styrene-polybutadiene-poly(α-methylstyrene), and combinations thereof.

Suitable non-hydrogenated block copolymers, which are commercially obtainable, are various products having the brand names SOLPRENE® (Phillips), KRATON® (Shell), VECTOR® (Dexco) and SEPTON® (Kuraray).

In accordance with a further preferred embodiment, the moulding compositions according to the invention are characterised in that the component (A2) contains a polyolefin homopolymer or an ethylene-α-olefin-copolymer, particularly preferably an EP and/or EPDM elastomer (ethylene propylene rubber or ethylene propylene diene rubber). For example, this may be an elastomer based on an ethylene-C3-12-α-olefin copolymer with 20 to 96, preferably 25 to 85% by weight of ethylene, wherein the C3-12-α-olefin is particularly preferably an olefin selected from the group propene, 1-butene, 1-pentene, 1-hexene, 1-octene, 1-decene and/or 1-dodecene, and the component C is particularly preferably ethylene propylene rubber and/or LLDPE and/or VLDPE.

Alternatively or additionally (for example in mixture), (A2) may contain a terpolymer based on ethylene-C3-12-α-olefin with an unconjugated diene, wherein this preferably contains 25 to 85% by weight of ethylene and at most approximately 10% by weight of an unconjugated diene, wherein the C3-12-α-olefin is particularly preferably an olefin selected from the group propene, 1-butene, 1-pentene, 1-hexene, 1-octene, 1-decene and/or 1-dodecene, and/or wherein the unconjugated diene is preferably selected from the group bicyclo(2.2.1) heptadiene, hexadiene-1.4, dicyclopentadiene and/or in particular 5-ethylidene norbornene.

In addition, ethylene acrylate copolymers are a possible constituent for the component (A2). Further possible forms of constituents for the component (A2) are ethylene butylene copolymers or mixtures (blends) containing systems of this type.

The component (A2) preferably has constituents comprising acid anhydride groups, which are introduced by thermal or radical reaction of the primary chain polymer with an unsaturated dicarboxylic acid anhydride, an unsaturated dicarboxylic acid or an unsaturated dicarboxylic acid mono alkyl ester in a concentration sufficient for good bonding to the polyamide, wherein, for this purpose, reagents selected from the following group are preferably used: maleic acid, maleic acid anhydride, maleic acid mono butyl ester, fumaric acid, aconitic acid and/or itaconic acid anhydride.

0.1 to 4.0% by weight of an unsaturated anhydride are preferably grafted onto the impact toughness component as a constituent of (A2), or the unsaturated dicarboxylic acid anhydride or the precursor thereof is grafted on together with a further unsaturated monomer. The grafting degree is generally preferably in a range of 0.1-1.0%, particularly preferably in a range of 0.3-0.7%. A mixture of an ethylene propylene copolymer and an ethylene butylene copolymer, with a maleic acid anhydride grafting degree (MAH grafting degree) in the range of 0.3-0.7%, is also a possible constituent of component (A2). The above-specified possible systems for the component may also be used in mixtures. Furthermore, the component (A2) may have constituents that have functional groups, such as carboxylic acid groups, ester groups, epoxy groups, oxazoline groups, carbodiimide groups, isocyanate groups, silanol groups and carboxylate groups, or contain combinations of two or more of the aforementioned functional groups. Monomers that carry these functional groups can be bonded to the elastomeric polyolefin by copolymerisation or grafting. In addition, the ITM based on olefin polymers can also be modified by grafting with an unsaturated silane compound, such as vinyltrimethoxysilane, vinyltriethoxysilane, vinyltriacetosilane, methacryloxypropyltrimethoxysilane or propenyltrimethoxysilane.

The elastomeric polyolefins are statistical, alternating or segmented copolymers with linear, branched or core-shell structure and contain functional groups, which can react with the end groups of the polyamides such that a sufficient level of compatibility results between the polyamide and the ITM.

The ITMs used as component (A2) therefore include homopolymers or copolymers of olefins, such as ethylene, propylene, butene-1, or copolymers of olefins and copolymerisable monomers, such as vinyl acetate, (meth)acrylic acid ester and methylhexadiene.

Examples of crystalline olefin polymers are low-density, medium-density and high-density polyethylenes, polypropylene, polybutadiene, poly-4-methylpentene, ethylene propylene block copolymers or statistical copolymers, ethylene methylhexadiene copolymers, propylene methylhexadiene copolymers, ethylene propylene butene copolymers, ethylene propylene hexene copolymers, ethylene propylene methylhexadiene copolymers, poly(ethylene vinyl acetate) (EVA), poly(ethylene ethyl acrylate) (EEA), ethylene octene copolymer, ethylene butane copolymer, ethylene hexene copolymer, ethylene propylene diene terpolymers, and combinations of the aforementioned polymers.

Examples of commercially obtainable impact toughness modifiers, which can be used within the scope of the constituents of component (A2), are: TAFMER MC201: g-MAH (~0.6%) blend of 67% EP copolymer (20 mol % propylene)+ 33% EB copolymer (15 mol % butene-1)); TAFMER MH5010: g-MAH (~0.6%) ethylene butylene copolymer; TAFMER MH7010: g-MAH (~0.7%) ethylene butylene copolymer; Mitsui. TAFMER MH7020: g-MAH (~0.7%) EP copolymer by Mitsui Chemicals; EXXELOR VA1801: g-MAH (~0.7%) EP copolymer; EXXELOR VA1803: g-MAH (0.5-0.9%) EP copolymer, amorph; EXXELOR VA1810: g-MAH (~0.5%) EP copolymer; EXXELOR MDEX 94-1 1: g-MAH (0.7%) EPDM, Exxon Mobile Chemical; FUSABOND MN493D: g-MAH (~0.5%) ethylene octane copolymer; FUSABOND A EB560D (g-MAH) ethylene n-butyl acrylate copolymer; ELVALOY, DuPont.

An ionomer within the scope of component (A2) is also preferred, in which the polymer-bonded carboxyl groups are interconnected completely or partially by metal ions. Mixed polymers of butadiene with styrene functionalised by grafting with maleic acid anhydride, nonpolar or polar olefin homopolymers and copolymers, which are produced by grafting with maleic acid anhydride, and carboxylic-acid-functionalised copolymers such as poly(ethene-co-(meth) acrylic acid) or poly(ethene-co-1-olefin-co-(meth)acrylic acid), in which the acid groups are neutralised in part with metal ions, are particularly preferred.

The moulding composition preferably consists of 20 to 80% by weight of polyamide (A1), which can be formed from aliphatic, cycloaliphatic or aromatic monomers. In particular, the moulding compositions according to the invention contain semi-crystalline, aliphatic polyamides, semi-crystalline or amorphous, semi-aromatic polyamides, and semi-crystalline or amorphous polyamides, for example based on cycloaliphatic diamines.

The matrix of the polyamide moulding compositions used in accordance with the invention is further based, as has been described above, preferably on at least one semi-crystalline, aliphatic polyamide (component A1_1) and/or semi-aromatic polyamide (component A1_2), and/or on at least one amorphous polyamide (component A1_3) based on cycloaliphatic diamines, or on a mixture of components A1_1 and A1_2, A1_1 and A1_3 or a mixture of type A1_1, A1_2 and A1_3.

The aforementioned polyamides can be produced from the following dicarboxylic acids: adipic acid, suberic acid, azelaic acid, sebacic acid, undecane diacid, dodecane diacid, tridecane diacid, tetradecane diacid, pentadecane diacid, hexadecane diacid, heptadecane diacid, octadecane diacid, C36-dimer fatty acid, isophthalic acid, terephthalic acid, naphthalene dicarboxylic acid, cis- and/or trans-cyclohexane-1,4-dicarboxylic acid and/or cis- and/or trans-cyolohexane-1,3-dicarboxylic acid (CHDA) and mixtures thereof.

The following monomers can be considered as diamines: 1,4-butanediamine, 1,5-pentanediamine, 2-methyl-1,5-pentanediamine, 2-butyl-2-ethyl-1,5-pentanediamine, 1,6-hexanediamine, 2,2,4-trimethylhexamethylenediamine, 2,4,4-trimethylhexamethylenediamine, 1,8-octanediamine, 2-methyl-1,8-octanediamine, 1,9-nonanediamine, 1,10-decanediamine, 1,11-undecanediamine, 1,12-dodecanediamine, 1,13-tridecanediamine, 1,14-tetradecanediamine, m-xylylenediamine and p-xylylenediamine. Furthermore, the polyamides can also be based on lactams or amino carboxylic acids, in particular α,ω-amino acids or lactams comprising 6 to 12 carbon atoms, wherein the following selection is mentioned by way of example: m-aminobenzoic acid, p-aminobenzoic acid, caprolactam (CL), ω-aminocaproic acid, ω-aminoheptanoic acid, ω-aminoctanoic acid, ω-aminononanoic acid, ω-aminodecanoic acid, ω-aminoundecanoic acid (AUA), laurolactam (LL) and α,ω-aminododecanoic acid (ADA). Caprolactam, aminocaproic acid, laurolactam, and aminododecanoic acid are particularly preferred. Suitable cycloaliphatic diamines are those comprising 6 to 24 carbon atoms, such as bis-(4-amino-3-methyl-cyclohexyl)-methane (MACM), bis-(4-amino-cyclohexyl)-methane (PACM), bis-(4-amino-3-ethyl-cyclohexyl)-methane (EACM), bis-(4-amino-3,5-dimethyl-cyclohexyl)-methane (TMACM), 2,6-norbornane diamine or 2,6-bis-(aminomethyl)-norbornane or 1,3-cyclohexyldiamine, 1,4-cyclohexyldiamine, bis-(1,3-aminomethyl)cyclohexane, isophorone diamine, cyclohexane diamine, 1,3-bis-(aminomethyl)cyclohexane, 1,4-bis-(aminomethyl)cyclohexane, isophorone diamine, norbornane dimethylamine, 2,2-(4,4'-diaminodicyclohexyl)propane (PACP), or mixtures thereof. In particular, alkyl-substituted bis-(aminocyclohexyl)methane or bis-(aminocyclohexyl)propane is preferred. Linear and/or branched C1-C6, preferably C1-C4 alkyl groups are preferred as alkyl substituents, therefore in particular methyl groups, ethyl groups, propyl groups, isopropyl or butyl groups, with methyl groups being preferred in particular. Bis-(4-amino-3-methyl-cyclohexyl)-methane (MACM) is used as alkyl-substituted bis-(aminocyclohexyl)methane in a particularly preferred embodiment.

The polyamides A1_1 or A1_2 or A1_3 preferably have a solution viscosity $\eta_{rel}$, measured in m-cresol (0.5% by weight, 20° C.) in the range from 1.4 to 3.0, preferably in the range from 1.5 to 2.7, in particular in the range from 1.5 to 2.4.

Polyamide 46, polyamide 6, polyamide 66, polyamide 11, polyamide 12, polyamide 1212, polyamide 1010, polyamide 1012, polyamide 1112, polyamide 610, polyamide 612, polyamide 69, polyamide 810, or mixtures, blends, or alloys thereof are preferred as aliphatic polyamides.

Preferred amorphous or semi-crystalline polyamides based on cycloaliphatic diamines are MACM9, MACM10, MACM11, MACM12, MACM13, MACM14, MACM16, MACM18, PACM9, PACM10, PACM11, PACM12, PACM13, PACM14, PACM16, PACM18 or copolyamides, such as MACMI/12, MACMT/12, 6I/6T/MACMI/MACMT/

12, 3-6T, 6I/MACMI/MACMT, 6I/PACMI/PACMT, 6I/6T/MACMI, MACMI/MACM36, 12/PACMI or 12/MACMT, 6/PACMT, 6/IPDT, or mixtures thereof, MACM10/PACM10 and MACM12/PACM12, and mixtures thereof.

Semi-aromatic polyamides are preferably based either on aromatic dicarboxylic acids comprising 8 to 18, preferably 8 to 14 carbon atoms, or on diamines having aromatic structural units, such as PXDA and/or MXDA. Preferred aromatic dicarboxylic acids are TPA, naphthalene dicarboxylic acid and IPA. Preferred semi-aromatic polyamides are based on the following polyamide systems: 4T, 5T, DT, 6T, 9T, MT, 10T, 12T, 4I, 5I, DI, 6I, 9I, MI, 10I, 12I. These can be combined with one another as homopolyamides and also as binary, ternary or quaternary copolyamides, provided this is allowed by the processing temperature. Furthermore, aliphatic polyamide systems, such as PA46, PA6, PA66, PA11, PA12, PA1212, PA1010, PA1012, PA610, PA612, PA69, PA81, can also be combined. Preferred semi-aromatic polyamides are: MXD6, MXD10, MXDI/MXD6, 6T/6I, 6T/66, 6T/10T, 6T/12, 11/10T, 12/10T, 10T/1010, 10I/10T, 10T/1012, 9MT (M stands for 2-methyloctane diamine), 12T.

With regard to the polyamides A2, the copolyamides 6T/6I, 10I/10T, MXD6/MXDI and also the homopolyamides MACM12 and MXD6 are preferred. With regard to the copolyamides 6T/6I, two different composition ranges are particularly preferred. On the one hand, these are the amorphous copolyamides having a proportion of less than 50 mol % of 6T units, wherein a composition range 6T:6I from 20:80 to 45:55 is preferred, and on the other hand these are the copolyamides having a high melting point with a 6T proportion of greater than 50 mol %, wherein a composition range 6T:6I from 55:45 to 80:20, in particular from 65:35 to 75:25, is preferred. With regard to the copolyamides MXD6/MXDI, MXD6-rich compositions are preferred, in particular with an MXD6 content of greater than 80 mol %, particularly preferably in the range from 82 to 95 mol %. With regard to a polymer mixture containing the polyamide components A1_1 and A1_2, A1_1 and A1_3, A1_2 and A1_3 and also A1_1, A1_2 and A1_3, the following compositions are preferred:

(A1_1): PA 66
(A1_2): PA 6I/6T, wherein the molar ratio is in the range from 65:35 to 75:25, or in particular is 67:33.
(A1_1): PA 610 and/or PA1010, wherein, in the case of a mixture, the components are used in a ratio from 1:1 to 4:1.
(A1_2): PA 6I/6T, wherein the molar ratio lies in the range from 65:35 to 75:25, or in particular is 67:33.
(A1_1): mixture of PA 6 and PA66, in a ratio from 1:2 to 1:4, in particular of 1:4
(A1_2): PA 6I/6T, wherein the molar ratio lies in the range from 65:35 to 75:25, or in particular is 67:33.
(A1_1): PA 66
(A1_2): PA 6T/6I, wherein the molar ratio lies in the range from 60:40 to 75:25 or in particular is 70:30.
(A1_1): PA 66
(A1_2): PA 6T/66, wherein the molar ratio lies in the range from 50:50 to 70:30 or in particular is 55:45.
(A1_1): PA 66
(A1_2): MXD6, MXD10 or PA MXD6/MXDI, wherein, in the copolyamide, the molar ratio lies in the range from 70:30 to 90:10, or in particular is 88:12.
(A1_1): PA 12
(A1_3): PA MACM12.
(A1_1): PA 12
(A1_3): PA MACMI/12, wherein the content of laurolactam lies in the range from 15 to 45 mol %, preferably less than 40 mol %, and in particular lies in the range from 20 to 35 mol %.

Here, the proportion of component (A1_1) preferably lies in each case in the range from 50 to 90% by weight, in particular from 60 to 85% by weight, and the proportion of component (A1_2) and/or (A1_3) preferably lies in the range from 10 to 50% by weight, in particular in the range from 15 to 40% by weight.

In a specific embodiment, the following compositions are preferred for the polymer mixture (polyamide matrix):
(A1_1): 50-100% by weight PA 1010 or PA 1012 or PA 11 or PA 12
(A1_3): 0-50% by weight PA MACM12 or PA MACMI/12 or PA PACM12/MACM12,
(A1_1): 55-85% by weight PA 610 or PA 612 or PA 1010 or PA 1012 or PA 1210 or PA1212
(A1_3): 15-45% by weight PA 6T/6I or PA 10T/10I, wherein the 6I or 10I proportion respectively is 55-80 mol % (preferably 60-75 mol %).
(A1_1): 70-100% by weight of a mixture of PA 6 and PA66, in a ratio from 1:2 to 1:4, in particular of 1:4
(A1_2): 0-30% by weight PA 6I/6T, wherein the molar ratio lies in the range from 65:35 to 75:25, or in particular is 67:33.

In a further embodiment, the component A1_2 has a glass transition temperature of greater than 90° C., preferably greater than 110° C. and particularly preferably greater than 140° C. The following embodiment is particularly preferred:
(A1_1): 55-85% by weight PA 610 or PA 612 or PA 1010 or PA 1012 or PA 1210 or PA 1212
(A1_3): 15-45% by weight PA 6T/6I or PA 10T/10I, wherein the 6I or 10I proportion respectively is 55-80 mol % (preferably 60-75 mol %).

Semi-aromatic, semi-crystalline polyamide systems can preferably also be used as component (A1).

Moulding composition that are suitable for reflow soldering, that is to say that can withstand temporary temperature loads of 260-270° C. without warping and blistering, are preferably involved.

In accordance with a preferred embodiment, the component (A1), which then preferably makes up the totality of (A), is formed from PA 10T/6T copolyamide, wherein this is formed from:
(AA) 40 to 95 mol %, preferably 60 to 95 mol % of 10T units, formed from the monomers 1,10-decanediamine and terephthalic acid;
(BB) 5 to 60 mol %, preferably 5 to 40 mol % of 6T units, formed from the monomers 1,6-hexanediamine and terephthalic acid.

Here, up to 30% of the monomers within the component (A1) thus formed can be replaced, that is to say the above is true on the one hand with the provision that, in component (A1), up to 30 mol % of the terephthalic acid, based on the total amount of dicarboxylic acids, can be replaced in (AA) and/or (BB), independently of one another, by other aromatic, aliphatic or cycloaliphatic dicarboxylic acids comprising 6 to 36 carbon atoms. Furthermore, the above is true on the other hand with the provision that, in component (A1), up to 30 mol % of 1,10-decanediamine or 1,6-hexanediamine, based on the total amount of diamines, can be replaced in (AA) and/or (BB), independently of one another, by other diamines comprising 4 to 36 carbon atoms. Last but not least, the above is also true with the provision that no more than 30 mol % in component (A1), based on the total amount of monomers, can be formed by lactams or amino acids. It is, however, preferable if this replacement of the monomers within component (A1) in accordance with the above provisions accounts for less than 20%, preferably less than 10%, and if in particular there is preferably no replacement of this type. On the whole, a further provision is the fact that the sum of the monomers replacing the terephthalic acid, 1,6-hexanediamine and 1,10-decanediamine (that is to say the total proportion of other aromatic, aliphatic or cycloaliphatic dicarboxylic acids comprising 6 to 36 carbon atoms, of other diamines comprising 4 to 36 carbon atoms, and of lactams or amino acids) does not exceed a concentration of 30 mol %, preferably 20 mol %, in particular 10 mol %, based on the total amount of the monomers used in component A.

In accordance with a preferred embodiment, the component (A1), which then preferably makes up the totality of (A), is then preferably formed from polyamide 10T/10I/6T/6I, specifically a semi-aromatic, semi-crystalline copolyamide formed from 100% by weight of diacid fraction composed of:
  72.0-98.3% by weight of terephthalic acid (TPA);
  28.0-1% by weight of isophthalic acid (IPA)
and 100% by weight of diamine fraction composed of:
  51.0-80.0% by weight of 1,6-hexanediamine (HMDA);
  20.0-49.0% by weight of C9-C12 diamine;
wherein the C9-C12 diamine is a diamine selected from the group: 1,9-nonanediamine, methyl-1,8-octanediamine, 1,10-decanediamine, 1,11-undecanediamine, 1,12-dodecanediamine, or a mixture of diamines of this type, wherein 1,10-decanediamine and 1,12-dodecanediamine are preferred, and 1,10-decanediamine alone is particularly preferred. A polyamide system PA 10T/10I/6T/6I is thus preferred, wherein the above concentrations apply.

In accordance with a preferred embodiment, the component (A1), which then preferably makes up the totality of (A), is formed from polyamide PA 6T/6116, specifically a semi-aromatic, semi-crystalline copolyamide formed from terephthalic acid (TPA), isophthalic acid (IPA), 1,6-hexanediamine (HMDA) and caprolactam (CLM) or aminocaproic acid, wherein the copolyamide 6T/6I/6 has the composition 60-80/15-25/5-15% by weight particularly preferably 65-75/17.5-22.5/7.5-12.5% by weight.

To summarise, it can be determined that the component (A1) is preferably a homopolyamide and/or copolyamide formed from aliphatic, cycloaliphatic and/or aromatic monomers, and is preferably a mixture of a semi-crystalline, aliphatic polyamide (A1_1) and/or a semi-aromatic polyamide (A1_2), and/or an amorphous polyamide (A1_3), wherein the polyamides of component (A1) are preferably selected from the following group: polyamide 46, polyamide 6, polyamide 66, polyamide 11, polyamide 12, polyamide 1212, polyamide 1010, polyamide 1012, polyamide 1112, polyamide 610, polyamide 612, polyamide 69, polyamide 810, MACM9, MACM10, MACM11, MACM12, MACM13, MACM14, MACM16, MACM18, PACM9, PACM10, PACM11, PACM12, PACM13, PACM14, PACM16, PACM18 or copolyamides, such as MACMI/12, MACMT/12, 6I/6T/MACMI/MACMT/12, 3-6T, 6I/MACMI/MACMT, 6I/PACMI/PACMT, 6I/6T/MACMI, MACMI/MACM36, 12/PACMI, 12/MACMT, 6/PACMT, 6/IPDT, MACM10/PACM10, MACM12/PACM12, MXD6, MXD10, MXDI/MXD6, 6T/6I, 6T/66, 6T/10T, 6T/12, 11/10T, 12/10T, 10T/1010, 10I/10T, 10T/1012, PA10T/6T, PA6T/10I/10T, PA6T/6I/6, 9MT (M stands for 2-methyloctane diamine), 12T, and mixtures or blends thereof.

Furthermore, the moulding composition contain 10 to 70% by weight of glass fibres (B1), selected from the group consisting of (B1_1) glass fibres, preferably from E-glass, with a non-circular cross section (flat fibres) and with an axis ratio of the main cross-sectional axis to the secondary cross-sectional axis of at least 2, and/or (B1_2) high-strength glass fibres with a circular or non-circular cross section and a glass composition based substantially on the components silicon dioxide, aluminium oxide and magnesium oxide, which for example are used in the form of what are known as short fibres (for example cut glass with a length of 0.2-20 mm) or endless fibres (rovings).

E-glass fibres in accordance with ASTM D578-00 are preferably selected as glass fibres (B1_1) with a non-circular cross section, preferably formed from 52-62% of silicon dioxide, 12-16% of aluminium oxide, 16-25% of calcium oxide, 0-10% of borax, 0-5% of magnesium oxide, 0-2% of alkali oxides, 0-1.5% of titanium dioxide and 0-0.3% of iron oxide.

The high-strength glass fibre (B1_2) used is based on the ternary system silicon dioxide/aluminium oxide/magnesium oxide or on the quaternary system silicon dioxide/aluminium oxide/magnesium oxide/calcium oxide, wherein the sum of the contents of silicon dioxide, aluminium oxide and magnesium oxide is at least 78% by weight, preferably at least 87% and particularly preferably at least 92%, based on the total glass composition.

Specifically, a composition of 58-70% by weight of silicon dioxide ($SiO_2$), 15-30% by weight of aluminium oxide ($Al_2O_3$), 5-15% by weight of magnesium oxide (MgO), 0-10% by weight of calcium oxide (CaO) and 0-2% by weight of further oxides, such as zirconium dioxide ($ZrO_2$), boron oxide ($B_2O_3$), titanium dioxide ($TiO_2$) or lithium oxide ($Li_2O$), is preferably used.

In a further embodiment, the high-strength glass fibre has a composition of 60-67% by weight of silicon dioxide ($SiO_2$), 20-28% by weight of aluminium oxide ($Al_2O_3$), 7-12% by weight of magnesium oxide (MgO), 0-9% by weight of calcium oxide (CaO) and also 0-1.5% by weight of further oxides, such as zirconium dioxide ($ZrO_2$), boron oxide ($B_2O_3$), titanium dioxide ($TiO_2$), or lithium oxide ($Li_2O$).

The high-strength glass fibre particularly preferably has the following composition: 62-66% by weight of silicon dioxide ($SiO_2$), 22-27% by weight of aluminium oxide ($Al_2O_3$), 8-12% by weight of magnesium oxide (MgO), 0-5% by weight of calcium oxide (CaO), and 0-1% by weight of further oxides, such as zirconium dioxide ($ZrO_2$), boron oxide ($B_2O_3$), titanium dioxide ($TiO_2$), or lithium oxide ($Li_2O$).

The high-strength glass fibre has a tensile strength of greater than or equal to 3700 MPa, preferably of at least 3,800 or 4,000 MPa, an elongation at tear of at least 4.8%, preferably of at least 4.9 or 5.0%, and a tensile modulus of elasticity of greater than 75 GPa, preferably of more than 78 or 80 GPa, wherein these glass properties are to be determined on individual fibres (pristine single filament) having a diameter of 10 µm and a length of 12.7 mm at a temperature of 23° C. and a relative humidity of 50%.

Specific examples for these high-strength glass fibres of component (B1) are S-glass fibres by Owens Corning with 995 size, T-glass fibres by Nittobo, HiPertex by 3B, HS4-glass fibres by Sinoma Jinjing Fiberglass, R-glass fibres by Vetrotex and S-1- and S-2-glass fibres by AGY.

The high-strength glass fibres (B1_2) preferably have a circular or non-circular cross-sectional area. The glass fibres (B1_1) always have a non-circular cross section, whereas the glass fibres (B2) always have a circular cross section. The fibrous filler (B3) may have a circular or a non-circular cross section.

Glass fibres with a circular cross section, that is to say round glass fibres, typically have a diameter in the range of 5-20 µm, preferably in the range of 6-17 µm and particularly preferably in the range of 6-13 µm. They are preferably used as short glass fibres (cut glass with a length from 0.2 to 20 mm, preferably 2-12 mm).

In the case of the flat glass fibres, that is to say glass fibres with a non-circular cross-sectional area, these glass fibres are preferably used with a dimensional ratio of the main cross-sectional axis to the secondary cross-sectional axis arranged perpendicular thereto of more than 2, preferably from 2 to 8, in particular from 2 to 5. These "flat glass fibres" have an oval or elliptical cross-sectional area, an elliptical cross-sectional area provided with one or more constrictions (what are known as cocoon fibres), a polygonal or rectangular cross-sectional area, or a practically rectangular cross-sectional area. A further characterising feature of the flat glass fibres used lies in the fact that the length of the main cross-sectional axis preferably lies in the range from 6 to 40 µm, in particular in the range from 15 to 30 µm, and the length of the secondary cross-sectional axis preferably lies in the range from 3 to 20 µm, in particular in the range from 4 to 10 µm. Here, the flat glass fibres have a maximum packing density, that is to say the cross-sectional area of the glass fibres fills a virtual rectangle, surrounding the glass fibre cross section as exactly as possible, to an extent of at least 70%, preferably at least 80% and particularly preferably to an extent of at least 85%.

To reinforce the moulding compositions according to the invention, mixtures of glass fibres with circular and non-circular cross section can also be used, wherein the proportion of flat glass fibres is preferably predominant, that is to say makes up more than 50% by weight of the total mass of the fibres.

The glass fibres according to the invention may be provided in particular with a size suitable for thermoplastics, in particular for polyamide, containing a coupling agent based on an aminosilane or epoxysilane compound.

The high-strength glass fibres for example used as roving in accordance with the invention have a diameter from 8 to 20 µm, preferably from 12 to 18 µm, wherein the cross section of the glass fibres can be round, oval, elliptical, elliptical provided with one or more constrictions, polygonal, rectangular or practically rectangular. "Flat glass fibres" with a ratio of the cross-sectional axes from 2 to 5 are particularly preferred. These endless fibres are incorporated into the polyamide moulding compositions according to the invention by known methods for production of long-fibre-reinforced rod granulate, in particular by pultrusion methods, in which the endless fibre strand (roving) is fully saturated with the polymer melt and is then cooled and cut. The long-fibre-reinforced rod granulate obtained in this manner, which preferably has a granulate length from 3 to 25 mm, in particular from 4 to 12 mm, can be further processed by means of the conventional processing methods (such as injection moulding, pressing) to form moulded parts.

The fibre concentration (component (B) as a whole), but in particular also the glass fibre concentration (sum of components (B1) and (B2), and most preferably the concentration of component (B1) alone in the moulding compositions according to the invention is preferably between 30 and 60% by weight and particularly preferably between 35 and 55% by weight.

The flat glass fibres of component (B1_1) are preferably selected in this case for example as E-glass fibres in accordance with ASTM D578-00 with a non-circular cross section, preferably formed from 52-62% of silicon dioxide, 12-16% of aluminium oxide, 16-25% of calcium oxide, 0-10% of borax, 0-5% of magnesium oxide, 0-2% of alkali oxides, 0-1.5% of titanium dioxide and 0-0.3% of iron oxide.

The glass fibres of component (B1_1), as flat E-glass fibres, preferably have a density of 2.54-2.62 g/cm$^3$, a tensile modulus of elasticity of 70-75 GPa, a tensile strength of 3,000-3,500 MPa, and an elongation at tear of 4.5-4.8%, wherein the mechanical properties have been determined on individual fibres having a diameter of 10 µm and a length of 12.7 mm at 23° C. and a relative humidity of 50%.

The proportion of component (B2), preferably selected from the group consisting of round E-glass fibres, A-glass fibres, C-glass fibres, D-glass fibres, basalt fibres and mixtures thereof, in each case with a circular or non-circular cross-sectional area, preferably lies in the range of 0-10% by weight, preferably in the range of 0-5% by weight, wherein component (B1) is particularly preferably provided exclusively.

The component (B2) selected from the group consisting of: E-glass fibres (these consist, in accordance with ASTM D578-00, of 52-62% of silicon dioxide, 12-16% of aluminium oxide, 16-25% of calcium oxide, 0-10% of borax, 0-5% of magnesium oxide, 0-2% of alkali oxides, 0-1.5% of titanium dioxide and 0-0.3% of iron oxide; preferably have a density of 2.58±0.04 g/cm3, a tensile modulus of elasticity of 70-75 Gpa, a tensile strength of 3,000-3,500 MPa and an elongation at tear of 4.5-4.8%), A-glass fibres (63-72% of silicon dioxide, 6-10% of calcium oxide, 14-16% of sodium oxide and potassium oxide, 0-6% of aluminium oxide, 0-6% of boron oxide, 0-4% of magnesium oxide), C-glass fibres (64-68% of silicon dioxide, 11-15% of calcium oxide, 7-10% of sodium oxide and potassium oxide, 3-5% of aluminium oxide, 4-6% of boron oxide, 2-4% of magnesium oxide), D-glass fibres (72-75% of silicon dioxide, 0-1% of calcium oxide, 0-4% of sodium oxide and potassium oxide, 0-1% of aluminium oxide, 21-24% of boron oxide), basalt fibres (mineral fibre with approximate composition: 52% of $SiO_2$, 17% of $Al_2O_3$, 9% of CaO, 5% of MgO, 5% of $Na_2O$, 5% of iron oxide and further metal oxides), AR-glass fibres (55-75% of silicon dioxide, 1-10% of calcium oxide, 11-21% of sodium and potassium oxide, 0-5% of aluminium oxide, 0-8% of boron oxide, 0-12% of titanium dioxide, 1-18% of zirconium oxide, 0-5% of iron oxide), and mixtures thereof.

Component B2 is particularly preferably formed from glass fibres formed substantially from the components silicon dioxide, calcium oxide and aluminium oxide, and the ratio by weight of $SiO_2/(CaO+MgO)$ is less than 2.7, preferably less than 2.5 and in particular between 2.1 and 2.4. Component B2 is particularly an E-glass fibre according to ASTM D578-00.

The fibrous fillers of component (B1) and/or (B2) and/or (B3) can be present in the form of short fibres, preferably in the form of cut fibres having a length in the range of 0.2-20 mm, or in the form of endless fibres.

The proportion of component (C) preferably lies in the range of 3-8% by weight, preferably in the range of 3-6% by weight.

The component (C) is preferably an LDS additive with an absorption coefficient, different from zero, for UV, VIS or IR radiation, which forms metal nuclei under the action of electromagnetic radiation, preferably in the form of laser radiation, said metal nuclei facilitating and/or enabling and/or improving the deposition, in a chemical metallisation process, of metal layers in order to generate conductor tracks at the irradiated points over the surface of the moulded part, wherein the LDS additive preferably has an absorption capability in the visible and infrared radiation range with an absorption coefficient of at least 0.05, preferably at least 0.1, and in particular at least 0.2, and/or wherein an absorber is provided, which transfers the radiation energy to the LDS additive.

The component (C) is preferably an LDS additive with a mean particle size (D50) in the range from 50-10,000 nanometers, preferably 200 to 5,000 nanometers and particularly preferably 300 to 4,000 nanometers, and/or an aspect ratio of at most 10, in particular of at most 5. The D50 value specified as a measure for the particle size is a measure for the mean particle size, wherein 50 volume % of the sample are finer than the D50 value and the other 50% of the sample are coarser than the D50 value (median).

The component (C) is preferably an LDS (laser direct structuring) additive selected from the group of metal oxides, in particular what are known as spinels having the general chemical formula

wherein A stands for a metal cation with the valency 2, wherein A is preferably selected from the group consisting of: magnesium, copper, cobalt, zinc, tin, iron, manganese and nickel, and combinations thereof;

B stands for a metal cation of valency 3, wherein B is preferably selected from the group consisting of: manganese, nickel, copper, cobalt, tin, titanium, iron, aluminium and chromium, and combinations thereof, wherein the LDS additive particularly preferably is a copper iron spinel, a cupriferous magnesium aluminium oxide, a copper chromium manganese mixed oxide, a copper manganese iron mixed oxide, optionally in each case with oxygen defects, or salts and oxides of copper, in particular such as copper(I) oxide and, copper(II) oxide, alkaline copper phosphates, copper sulphate, and also metal complex compounds, in particular chelate compounds of copper, tin, nickel, cobalt, silver and palladium, or mixtures of such systems, and/or in particular is selected from the following group: copper chromium manganese mixed oxides, copper manganese iron mixed oxides, copper chromium oxide, zinc iron oxide, cobalt chromium oxide, cobalt aluminium oxide, magnesium aluminium oxide, and mixtures thereof and/or surface-treated forms thereof and/or forms thereof having oxygen defects. For example, such systems are described for example in WO-A-2000/35259 or in Kunststoffe 92 (2002) 11, 2-7.

The proportion of component (D) preferably lies in the range of 0-20% by weight, preferably in the range of 0-15% by weight, and particularly preferably in the range of 2-15% by weight or 3-10% by weight. For example, talc can facilitate the generation of metal nuclei.

The moulding composition may preferably be characterised in that the polyamide moulding composition is substantially, preferably completely, free from particulate filler of component (D).

All fillers known to a person skilled in the art can be considered as particulate fillers of component (D). These include, in particular, particulate fillers selected from the group consisting of: talc (magnesium silicate), mica, silicates, quartz, wollastonite, kaolin, silicic acids, magnesium carbonate, magnesium hydroxide, chalk, ground or precipitated calcium carbonate, lime, feldspar, inorganic pigments, such as barium sulphate, zinc oxide, zinc sulphide, titanium dioxide, iron oxide, iron manganese oxide, permanently magnetic or magnetisable metals or alloys, hollow-spherical silicate fillers, aluminium oxide, boron nitride, boron carbide, aluminium nitride, calcium fluoride, and mixtures thereof. The fillers may also be surface-treated.

These fillers (component D) have a mean particle size (D50) in the range of 0.1-40 μm, preferably in the range of 0.2-20 μm, in particular in the range of 0.3-10 μm. A form of the particulate fillers, in which the aspect ratios L/b1 and L/b2 are both at most 10, in particular at most 5, is preferred, wherein the aspect ratios are described by the quotients from the greatest length L of the particle to the average breadth b1 or b2 thereof. Here, b1 and b2, which are arranged perpendicularly with respect to one another, lie in a plane perpendicular with respect to the length L.

Of course, the thermoplastic polyamide moulding composition according to the invention may also contain conventional additives generally known to a person skilled in the art in the form of the additives (E), which are preferably selected from the group consisting of: adhesion promoters, halogen-containing flame retardants, halogen-free flame retardants, stabilisers, anti-ageing agents, antioxidants, antiozonants, light stabilisers, UV stabilisers, UV absorbers, UV blockers, inorganic heat stabilisers, in particular based on copper halides and alkali halides, organic heat stabilisers, conductive additives, carbon black, optical brighteners, processing aids, nucleation agents, crystallisation accelerators, crystallisation retarders, flow aids, lubricants, release agents, plasticisers, (organic) pigments, dyes, markers, and mixtures thereof.

The invention further relates to a component, in particular a component having electrical conductor tracks, based on a moulding composition as illustrated above. Fields of use for MID technology include automotive engineering, industrial automation, medical engineering, the domestic appliance industry, consumer electronics, telecommunications technology, metrology and analysis technology, mechanical engineering, and also aviation and aerospace. The invention therefore also relates to an article, in particular an interconnected device, containing a moulded part, produced from the moulding composition according to the invention. In one embodiment, the interconnected device is used in order to form an antenna.

Such moulded parts include, for example, casings or casing parts for portable electronic devices, such as PDAs, mobile telephones, and other telecommunications devices, casings or casing parts for personal computers, notebooks, medical devices, such as hearing aids, sensor technology, or RFID (radio frequency identification) transponders, or parts for the automotive industry, such as air bag modules and multi-functional steering wheels.

Due to the comprehensive shaping options with injection moulding of plastics, three-dimensional interconnected devices can be produced. In addition, typical mechanical functions, such as holders, guides, sensors, plugs or other connection elements, can be integrated. Connectors for E/E and for fuel systems are also possible. Further embodiments are specified in the dependent claims.

DESCRIPTION OF PREFERRED EMBODIMENTS

The invention will be described hereinafter with use of specific exemplary embodiments (B) and compared with the less efficient systems according to the prior art (VB). The exemplary embodiments specified below are intended to support the invention and to demonstrate the differences from the prior art, but are not intended to limit the general subject matter of the invention, as is defined in the claims.

Examples B1 to B6 and Comparative Examples VB1 to VB6

The components specified in Tables 1 to 4 were compounded in a twin-screw extruder by Werner and Pfleiderer having a screw diameter of 25 mm under predefined process parameters (see Table 1), wherein the polyamide granulate and the additives were metered into the feed zone, whereas the glass fibre was metered into the polymer melt via a side feeder, 3 housing units before the die. The composition summarised in Tables 2, 3 and 4 were removed in the form of a strand from a die having a 3 mm diameter and were granulated after water cooling. The granulate was dried for 24 hours at 110° C. under vacuum of 30 mbar. With regard to the moulding composition of examples B6 and VB6, the granulation was carried out by means of underwater granulation or die-face pelletisation under water, in which the polymer melt is pressed through a hole-type die and is granulated directly after the exit from the die by a rotating blade in a water flow. After granulation and drying at 120° C. for 24 h, the granulate properties were measured and the test specimen was produced.

TABLE 1

Compounding and injection moulding conditions for the examples and comparative examples

| Compounding/processing parameter | | B1, B2, VB1, VB2 | B3, B4, VB3, VB4 | B5, VB5 | B6, VB6 |
|---|---|---|---|---|---|
| compounding | cylinder temperatures | 260 | 270 | 250 | 330 |
| | screw rotational speed | 200 | 200 | 150 | 150 |
| | throughput | 10 | 10 | 8 | 8 |
| injection moulding | cylinder temperatures | 260 | 260 | 240 | 330 |
| | mould temperature | 40 | 40 | 80 | 120 |
| | screw perimeter speed | 15 | 15 | 15 | 15 |

Processing:

The compositions were injection moulded using an Arburg Allrounder 320-210-750 injection moulding machine at defined cylinder temperatures in zones 1 to 4 and at a defined mould temperature (see Table 1) to form test specimens.

TABLE 2

Composition and properties of examples B1 and B2 and also of comparative examples VB1, VB2-1 to VB2-3

| | Unit | B1 | B2 | VB1 | VB2-1 | VB2-2 | VB2-3 |
|---|---|---|---|---|---|---|---|
| Composition | | | | | | | |
| PA1010 | % by weight | 36.6 | 36.6 | 36.6 | 36.6 | 36.6 | 36.6 |
| PA 6I/6T (70:30) | % by weight | 9.1 | 9.1 | 9.1 | 9.1 | 9.1 | 9.1 |
| glass fibre E10 | % by weight | | | 50.0 | | | 54.0 |
| glass fibre S10 | % by weight | 50.0 | | | 54.0 | | |
| glass fibre E7 × 28 | % by weight | | 50 | | | 54 | |
| copper chromite ($Cu_2CrO_4$) | % by weight | 4.0 | 4.0 | 4.0 | 0 | 0 | 0 |
| Irganox 1098 | % by weight | 0.3 | 0.3 | 0.3 | 0.3 | 0.3 | 0.3 |
| Properties | | | | | | | |
| tensile modulus of elasticity | MPa | 15300 | 12900 | 11500 | 17300 | 15500 | 14300 |
| tear strength | MPa | 167 | 139 | 135 | 205 | 207 | 203 |
| elongation at tear | % | 2.5 | 2.0 | 2.1 | 3.4 | 2.9 | 3.5 |
| impact toughness 23° C. | $kJ/m^2$ | 59 | 50 | 44 | 74 | 93 | 78 |
| notch toughness 23° C. | $kJ/m^2$ | 11 | 9 | 8 | 14 | 20 | 14 |
| metallisation index | — | 0.65 | 0.70 | 0.68 | n.d | n.d | n.d |
| adhesive strength | [N/mm] | 1.35 | 1.48 | 1.16 | n.d | n.d | n.d |
| adhesive strength after storage | — | 0. | 0 | 1 | n.d | n.d | n.d |

TABLE 3

Composition and properties of examples B3 and B4 and also of comparative examples VB3, VB4-1 to VB4-3

|  | Unit | B3 | B4 | VB3 | VB4-1 | VB4-2 | VB4-3 |
|---|---|---|---|---|---|---|---|
| Composition | | | | | | | |
| PA 12 | % by weight | 45.7 | 45.7 | 45.7 | 49.7 | 49.7 | 49.7 |
| glass fibre E10 | % by weight | | | 50.0 | | | 50.0 |
| glass fibre S10 | % by weight | 50.0 | | | 50.0 | | |
| glass fibre E7x28 | % by weight | | 50 | | | 50 | |
| copper chromite ($Cu_2CrO_4$) | % by weight | 4.0 | 4.0 | 4.0 | 0 | 0 | 0 |
| Irganox 1098 | % by weight | 0.3 | 0.3 | 0.3 | 0.3 | 0.3 | 0.3 |
| Properties | | | | | | | |
| tensile modulus of elasticity | MPa | 12900 | 12400 | 11100 | 13500 | 13200 | 12000 |
| tear strength | MPa | 152 | 119 | 115 | 165 | 180 | 160 |
| elongation at tear | % | 3.3 | 2.6 | 2.8 | 5.5 | 3.3 | 5.3 |
| impact toughness 23° C. | $kJ/m^2$ | 65 | 55 | 48 | 78 | 98 | 73 |
| notch toughness 23° C. | $kJ/m^2$ | 18 | 16 | 12 | 24 | 29 | 23 |
| metallisation index- | — | 0.46 | 0.52 | 0.49 | n.d | n.d | n.d |
| adhesive strength | [N/mm] | 0.94 | 1.01 | 1.06 | n.d | n.d | n.d |
| adhesive strength after storage | — | 0 | 0 | 0 | n.d | n.d | n.d |

TABLE 4

Composition and properties of examples B5 and B6 and also of comparative examples VB5 and VB6

|  |  | B5 | VB5 | B6 | VB6 |
|---|---|---|---|---|---|
| Composition | | | | | | 
| PA1010 | % by weight | 44.6 | 44.6 | | |
| PA 6I/6T (70:30) | % by weight | 11.1 | 11.1 | | |
| PA6T/6I/10T/10I | % by weight | | | 67.7 | 67.7 |
| glass fibre E10 | % by weight | | 30.0 | | 30 |
| glass fibre S10 | % by weight | | | | |
| glass fibre E7x28 | % by weight | 30.0 | | 30 | |
| copper chromite ($Cu_2CrO_4$) | % by weight | 4.0 | 4.0 | 3.0 | 3.0 |
| Irganox 1098 | % by weight | 0.3 | 0.3 | 0.3 | 0.3 |
| Microtalc IT extra | % by weight | 10.0 | 10.0 | | |
| Properties | | | | | | 
| tensile modulus of elasticity | MPa | 11200 | 10100 | 11300 | 10900 |
| tear strength | MPa | 120 | 110 | 155 | 143 |
| elongation at tear | % | 2.1 | 2.1 | 2.2 | 1.8 |
| impact toughness 23° C. | $kJ/m^2$ | 48 | 32 | 59 | 35 |
| notch toughness 23° C. | $kJ/m^2$ | 10 | 7 | 16 | 9 |

TABLE 4-continued

Composition and properties of examples B5 and B6
and also of comparative examples VB5 and VB6

|  |  | B5 | VB5 | B6 | VB6 |
|---|---|---|---|---|---|
| metallisation index- | — | 0.85 | 0.78. | 0.72 | 0.65 |
| adhesive strength | [N/mm] | 1.55 | 1.40 | 0.94 | 0.88 |
| adhesive strength after storage | — | 0 | 0 | 0 | 1 | n.m.: non-metallisable;
n.d.: not determined
Key:
PA 6I/6T (70:30) amorphous, semi-aromatic polyamide based on terephthalic acid, isophthalic acid and 1,6-hexanediamine, with a glass transition temperature of 125° C. and a solution viscosity of 1.54.
PA 1010 semi-crystalline, aliphatic polyamide based on 1,10-decandiamine and sebacic acid, with a melting point of 200° C. and a solution viscosity of 1.78.
PA 12 semi-crystalline, aliphatic polyamide based on laurolactam, with a melting point of 178° C. and a solution viscosity of 1.96.
PA MACM12 amorphous polyamide based on bis-(4-amino-3-methyl-cyclohexyl)-methane and dodecane diacid, with a glass transition temperature of 156° C. and a solution viscosity of 1.82.
PA 6T/6I/10T/10I semi-crystalline, semi-aromatic polyamide, produced from 29.66% by weight of hexanediamine, 15.35% by weight of decanediamine, 47.25% by weight of terephthalic acid and 7.48% by weight of isophthalic acid with a melting point of 318° C. and a solution viscosity of 1.62.
glass fibre E10 cut glass fibres Vetrotex 995 consisting of E-glass, with a length of 4.5 mm and a diameter of 10 μm (circular cross section) by Owens Corning Fibreglass
glass fibre F7 × 28 cut glass fibres CSG3PA-820 consisting of E-glass, with a length of 3 mm, a main cross-sectional axis of 28 μm, a secondary cross-sectional axis of 7 μm and an axis ratio of 4 (non-circular cross section) by NITTO BOSEKI, Japan
glass fibre S10 cut glass fibres Vetrotex 995 consisting of E-glass, with a length of 4.5 mm and a diameter of 10 μm (circular cross section) by Owens Corning Fibreglass
copper chromite Shepherd Black 30C965 (The Shepherd Color Company), copper chromite (CuCr2O4) with a mean particle size of 0.6 μm.

Contrary to expectations, comparative tests VB2-1 to VB2-3 demonstrate that there are no advantages in terms of tear strength and elongation at tear for the reinforcement by means of S-glass fibres or flat E-glass fibres compared to round E-glass fibres. The values for tear strength, elongation at tear and impact toughness achieved for the moulding compositions argue against the selection of the S-glass fibres. The round E-glass fibre is practically equivalent apart from the tensile modulus of elasticity, and the flat E-glass fibres are considerably superior with respect to tear strength and impact toughness.

If an LDS additive, such as copper chromite (black spinel), is then added to these moulding compositions in a concentration of 4%, the mechanical properties of all moulding compositions considered thus worsen, sometimes drastically. However, mechanical properties of the moulding compositions (B1 and B2) reinforced with the S-glass fibre and with flat E-glass fibres decrease less severely than the moulding composition based on conventional E-glass (VB1).

The moulding compositions based on polyamide PA12 and summarised in Table 2 behave similarly. In this case too, the filler-free moulding composition reinforced with S-glass (VB4-1) also demonstrates hardly any advantages in respect of the mechanical properties compared to the cost-effective E-glass fibre (VB4-3), and even demonstrate disadvantages compared to the flat E-glass fibre (VB4-2). The flat E-glass fibre demonstrates advantages with regard to impact toughness. Only with the addition of copper chromite are the advantages of the S-glass fibre and the flat E-glass fibre evident, specifically considerably improved tear strength and greater elongation at tear and impact toughness.

Even with a predominantly amorphous matrix, as in examples B5 and VB5, approximately the same conditions as described above are produced. For the moulding composition according to the invention, there is a much greater tear strength and improved impact toughness with considerably greater rigidity.

The measurements were taken in accordance with the following standard and on the following test specimens.
Tensile Modulus of Elasticity:
    ISO 527 with a strain rate of 1 mm/min
    ISO tension bar, standard: ISO/CD 3167, Al type, 170×20/10×4 mm, temperature 23° C.
Tear Strength, Elongation at Tear:
    ISO 527 with a strain rate of 5 mm/min
    ISO tension bar, standard: ISO/CD 3167, Al type, 170×20/10×4 mm, temperature 23° C.
Impact Toughness, Notch Toughness by Charpy:
    ISO 179
    ISO test bar, standard: ISO/CD 3167, B1 type, 80×10×4 mm at temperature 23° C.
Melting Point (Tm), Enthalpy of Fusion (ΔHm) and Glass Transition Temperature (Tg):
    ISO standard 11357-11-2
    granulate
    Differential scanning calorimetry (DSC) was carried out with a heating rate of 20° C./min. The temperature for the onset is specified for the glass transition temperature (Tg).
Relative Viscosity:
    DIN EN ISO 307, in 0.5% by weight of m-cresol solution, temperature 20° C. granulate
Laser Structuring:
    In order to assess the metallisation behaviour, injection-moulded parts (plate 60×60×2 mm) were structured with the aid of an Nd:YAG laser and were then metallised currentlessly in a copper-plating bath. During the laser structuring process, 18 adjacent areas measuring 5×7 mm in size were irradiated over the surface of the moulded part. The laser structuring process was carried out by means of an LPKF Microline 3D laser at a wavelength of 1064 mm and an irradiation breadth of approximately 50 μm at a rate of 4 m/s. Here, both the pulse frequency and the power of the laser were varied. For the specific pulse frequencies of 60, 80 and 100 kHz, the power was varied in each case in the range of 3-17 watt. The moulded parts were then subjected, after the laser structuring process, to a cleaning process in order to remove the residues of the laser process. Here, the moulded parts pass through successive ultrasonic baths with surfactant and deionised water. The cleaned moulded parts are then metallised in a reductive copper-plating bath (MacDermid MID-Copper 100 B1) for 60-80 minutes. In so doing, copper is deposited on the areas irradiated by the laser in an average thickness of 3 to 5 µm.

Metallisation Index:

The degree of metallisation was determined in comparison to a reference material (PBT Pocan 7102). Here, the quotient (=metallisation index) from the copper layer thickness on the material in question and that on the reference material is established. The layer thickness of the conductor track is determined by means of X-ray fluorescence spectroscopy.

Adhesive Strength:

The adhesion of the copper conductive tracts produced is measured in a peel test in accordance with DIN IEC 326-3-7.1.

Adhesive Strength after Storage:

The adhesion of the copper layer after various storage conditions is obtained by means of the cross-cut test in accordance with EN DIN ISO 2409. For this purpose, 6 cuts continuing to the substrate are made at right angles using a multiple cutting blade with a cut spacing of 1 mm, such that a lattice pattern is produced. An adhesive strip having defined adhesive force is then pressed onto the cross-cut so that loose copper layer areas or copper layer areas adhering poorly to the substrate are removed. The visual assessment is carried out with the aid of an illuminated magnifier. The degree of adhesion is classified in accordance with the characteristic values 0-5, defined as follows:

0: the edges of the cuts are completely smooth; none of the squares of the lattice is chipped.
1: small splinters of the coating are chipped at the points of intersection of the lattice lines; chipped area is no greater than 5% of the cross-cut area.
2: the coating is chipped along the edges of the cut and/or at the points of intersection of the lattice lines. Chipped area is greater than 5%, but no greater than 15% of the cross-cut area.
3: the coating is chipped along the edges of the cuts in wide strips, either partially or completely, and/or some squares are chipped partially or completely. Chipped area is greater than 30%, but no greater than 50% of the cross-cut area.
4: the coating is chipped along the edges of the cuts in wide strips, and/or some squares are chipped completely or partially. Chipped area is greater than 35%, but no greater than 65% of the cross-cut area.
5: any chipping that can no longer be classified as grid cut characteristic value 4.

Storage Conditions:

The adhesion of the conductor track was measured with the aid of the above-described grid cut test after two different storage phases under the following conditions:

Profile 1: dry, temperature change from −40° C. to 85° C., 6 cycles, each lasting 8 h.
Profile 2: 95% relative humidity, temperature change from 25° C. to 55° C., 6 cycles, each lasting 24 h.

With all MID techniques, the chemically-reductive copper deposition is the decisive start metallisation process, which is key to the quality of the overall layer. It is therefore quite sufficient to assess the quality of the primary metal layer. In order to produce the finished MID part, nickel and then an end layer consisting of immersion gold are generally then deposited on the first copper layer (primary layer). Of course, other metal layers, such as further copper, palladium, tin or silver layers, can also be applied to the primary layer.

The invention claimed is:

1. A thermoplastic moulding composition consisting of:
(A) 20-88% by weight of a thermoplastic material;
(B) 10-60% by weight of fibrous fillers, formed from
 (B1) 10-60% by weight of glass fibres (B1-1) with a non-circular cross section, wherein the axis ratio of the main cross-sectional axis to the secondary cross-sectional axis is at least 2;
 (B2) 0-20% by weight of glass fibres, which are different from the glass fibres of component (B1) and have a circular cross section;
 (B3) 0-20% by weight of further fibrous fillers, which are different from the fibres of components (B1) and (B2), are not based on glass, and are selected from the group: carbon fibres, graphite fibres, aramid fibres, nanotubes;
(C) 2-10% by weight of laser direct structuring additive or a mixture of laser direct structuring-additives;
(D) 0-30% by weight of particulate filler; and
(E) 0-2% by weight of further, different additives;
wherein the sum of (A)-(E) makes up 100% by weight.

2. The moulding composition according to claim 1, wherein the component (A) consists of polyamide (A1) or a mixture of polyamides, with the proviso that up to 40%, thereof can be replaced by a thermoplastic material (A2) not based on polyamide.

3. The moulding composition according to claim 2, wherein the proportion of component (A) lies in the range of 25-82% by weight.

4. The moulding composition according to claim 1, wherein the proportion of component (B1) lies the range of 30-65% by weight.

5. The moulding composition as claimed in claim 1, characterised in that wherein the glass fibres of component (B1-1) are selected as E-glass fibres in accordance with ASTM D578-00 with a non-circular cross section.

6. The moulding composition according to claim 1, characterised in that the proportion of component (C) lies in the range of 3-8% by weight.

7. The moulding composition according to claim 1, wherein the component (C) is an laser direct structuring additive with an absorption coefficient, different from zero, for ultraviolet, visible or infrared radiation, which forms metal nuclei under the action of electromagnetic radiation and facilitates and/or enables and/or improves the chemical metallising deposition of conductor tracks at the irradiated points.

8. The moulding composition according to claim 7, wherein the component (C) is an laser direct structuring additive with an average particle size (D50) in the range of 50-10,000 nanometers.

9. The moulding composition according to claim 1, wherein the component (C) is an laser direct structuring additive selected from the group of metal oxides are known as spinels having the general chemical formula $AB_2O_4$ wherein A stands for a metal cation with the valency 2,
B stands for a metal cation of valency 3.

10. The moulding composition according to claim 1, characterised in that wherein the proportion of component (D) lies in the range of 0-20% by weight.

11. The moulding composition according to claim 1, wherein the particulate filler has particles of a mean particle size (D50) in the range of 0.1-40 [mu]m, and/or has an aspect ratio of at most 10.

12. The moulding composition according to claim 1, wherein the component (A) is selected from the group consisting of: polyamide, polycarbonate, polystyrene, polymethyl methacrylate, acrylonitrile butadiene styrene copolymer, acrylonitrile styrene copolymer, polyolefin, polyoxymethylene, polyester, polysulfone, polyphenylene ether, polyphenylene sulphide, polyphenylene oxide, liquid-crystalline polymers, polyether ketone, polyether ether ketone, polyimide, polyamide imide, polyester imide, polyether amide, polyester amide, polyether ester amide, polyurethane, polysiloxane, polyacrylate, polymethacrylate, and mixtures or copolymers based on such systems and/or in that the proportion of component (A2) lies in the range of 0-20% by weight and/or in that the proportion of component (B2), lies in the range of 0-10% by weight.

13. The moulding composition according to claim 1, wherein the glass fibres of component (B1) and/or (B2) and/or (B3) are present in the form of short fibers with a length approximating 0.2-20 mm, or in the form of endless fibres.

14. A component, in particular a component having electrical conductor tracks, based on a moulding composition according to claim 1.

15. The moulding composition according to claim 1, wherein the component (A) consists of polyamide (A1) or a mixture of polyamides, with the proviso that up to 5% thereof can be replaced by a thermoplastic material (A2) not based on polyamide.

16. The moulding composition according to claim 1, wherein the component (A) consists of polyamide (A1) or a mixture of polyamides.

17. The moulding composition according to claim 2, wherein total proportion of (A) in the form of polyamide (A1) is in the range of 25-82% by weight.

18. The moulding composition according to claim 2, wherein total proportion of (A) in the form of polyamide (A1) is in the range of 30-77% by weight.

19. The moulding composition according to claim 1, wherein the proportion of component (B1) lies in the range of 35-60% by weight.

20. The moulding composition according to claim 1, wherein the proportion of component (B1) lies the range of 30-65% by weight and wherein the proportions of (B2) and/or (B3) are further preferably zero.

21. The moulding composition as claimed in claim 1, wherein the glass fibres of component (B1-1) are selected as E-glass fibres in accordance with ASTM D578-00 with a non-circular cross section, consisting of 52-62% of silicon dioxide, 12-16% of aluminium oxide, 16-25% of calcium oxide, 0-10% of borax, 0-5% of magnesium oxide, 0-2% of alkali oxides, 0-1.5% of titanium dioxide and 0-0.3% of iron oxide.

22. The moulding composition according to claim 1, wherein the proportion of component (C) lies in the range of 3-6% by weight.

23. The moulding composition according to claim 1, wherein the component (C) is an laser direct structuring additive with an absorption coefficient, different from zero, for ultraviolet, visible or infrared radiation, which forms metal nuclei under the action of electromagnetic radiation, in the form of laser radiation, and facilitates and/or enables and/or improves the chemical metallising deposition of conductor tracks at the irradiated points, wherein the laser direct structuring additive has an absorption capability in the visible and infrared radiation range with an absorption coefficient of at least 0.2, and/or wherein an absorber is provided, which transfers the radiation energy to the laser direct structuring additive.

24. The moulding composition according to claim 7, wherein the component (C) is an laser direct structuring additive with an average particle size (D50) in the range of 300 to 4,000 nanometers, and/or has an aspect ratio of at most 5.

25. The moulding composition according to claim 1, wherein the component (C) is an laser direct structuring additive selected from the group of metal oxides, what are known as spinels having the general chemical formula

wherein A stands for a metal cation with the valency 2, wherein A is selected from the group consisting of: magnesium, copper, cobalt, zinc, iron, manganese, tin and nickel, and also combinations thereof;

B stands for a metal cation of valency 3, wherein B is selected from the group consisting of: manganese, nickel, copper, cobalt, tin, titanium, iron, aluminium and chromium, and also combinations thereof.

26. The moulding composition according to claim 1, wherein the component (C) is an laser direct structuring additive is a copper iron spinel, a cupriferous magnesium aluminium oxide, a copper chromium manganese mixed oxide, a copper manganese iron mixed oxide, optionally in each case with oxygen defects, or copper salts and oxides, namely copper(I) oxide, copper(II) oxide, alkaline copper phosphates, copper sulphate, and also metal complex compounds, or chelate compounds of copper, tin, nickel, cobalt, silver and palladium, or mixtures of such systems, and/or is selected from the following group: copper chromium manganese mixed oxides, copper manganese iron mixed oxides, copper chromium oxide, zinc iron oxide, cobalt chromium oxide, cobalt aluminium oxide, magnesium aluminium oxide, and mixtures and/or surface-treated forms thereof and/or forms thereof having oxygen defects.

27. The moulding composition according to claim 1, wherein the proportion of component (D) lies in the range of 3-10% by weight.

28. The moulding composition according to claim 1, wherein the particulate filler has particles of a mean particle size (D50) in the range of 0.3-10 μm, and/or has an aspect ratio of at most 5, or is formed substantially by such particles.

29. The moulding composition according to claim 1, wherein the proportion of component (A2) is in the range 0-5% by weight, or wherein component (A1) is provided exclusively;

and/or in that the proportion of component (B2), selected from the group consisting E-glass fibres, A-glass fibres, C-glass fibres, D-glass fibres, basalt fibres and mixtures thereof, lies in the range of 0-5% by weight, or wherein component (B1) is provided exclusively.

30. The moulding composition according to claim 1, wherein the glass fibres of component (B1) and/or (B2) are present in the form of short fibres, in the form of cut glass with a length in the range of 0.2-20 mm.

31. A component having electrical conductor tracks, based on a moulding composition according to claim 1.

32. A component having electrical conductor tracks, based on a moulding composition according to claim 1, as a casing or casing part for portable electronic devices, as personal digital assistants, mobile telephones, telecommunications devices, casings or casing parts for personal computers, notebooks, medical devices, i hearing aids, sensor technology, or radio frequency identification transponders or parts for the automotive field, as air bag modules and multi-function steering wheels.

* * * * *